C. S. PINKHAM,

Assignor to E. G. PINKHAM.

LIQUID HOLDER.

No. 10,732. Reissued June 8, 1886.

WITNESSES

William Scott

Frances M. Brown

INVENTOR

Charles S. Pinkham by his Attorneys

Brown Bros.

N. PETERS, Photo-Lithographer, Washington, D. C.

UNITED STATES PATENT OFFICE.

CHARLES S. PINKHAM, OF WOLLASTON, QUINCY, ASSIGNOR TO ETTA G. PINKHAM, OF BOSTON, MASSACHUSETTS.

LIQUID-HOLDER.

SPECIFICATION forming part of Reissued Letters Patent No. 10,732, dated June 8, 1886.

Original No. 334,046, dated January 12, 1886. Application for reissue filed May 1, 1886. Serial No. 200,869.

*To all whom it may concern:*

Be it known that I, CHARLES S. PINKHAM, a citizen of the United States, residing at Wollaston, Quincy, Norfolk county, Massachusetts, formerly of Boston, in the county of Suffolk and State of Massachusetts, have invented certain new and useful Improvements in Liquid-Holders; and I do hereby declare the following to be a full, clear, and exact description of the invention, such as will enable others skilled in the art to which it appertains to make and use the same.

This invention relates to liquid-holders, and has for its object to provide a receptacle or holder for the liquid, combined with a swab or brush, or other absorbent, and the whole so that it may be used for the desk or carried in the pocket, be easily filled, and its contents made from time to time, as may be necessary, to saturate or fill the absorbent material employed, and so as to preserve the swab against hardening.

In the carrying out this invention in this most practical and best form a rigid cylinder is employed to hold the liquid, and which at one end is provided with a contracted neck holding the swab, and adapted to receive a cap or cover to incase said swab and close it from the air, and capable of ready detachment and attachment, and at the other end is provided with an elastic bulb, preferably detachably attached to the cylinder, and by operating which the swab can be saturated or filled with the liquid contained in the cylinder.

Figure 1:
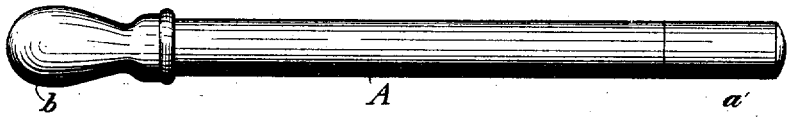
Figure 2:
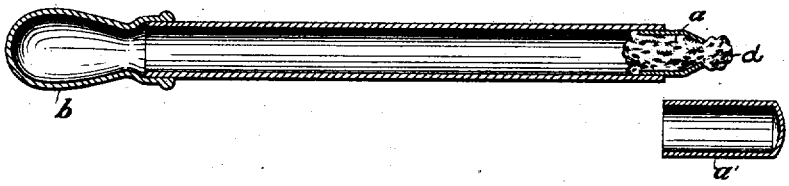

In the drawings forming a part of this specification, and which are in illustration of the most practical and best form of carrying out the invention as above stated, Figure 1 is an exterior view of the holder with the swab cover or cap attached; and Fig. 2 is a longitudinal section with the swab cover or cap removed, and as so detached shown below the swab in section.

In the drawings, A is a cylinder or reservoir, which may be and preferably is made in itself of a rigid material—as, for instance, metal, hard rubber, glass, porcelain, &c. This reservoir, however, may be made of other materials than those particularly specified, and the invention is not to be limited in that relation. The reservoir A of itself is open from end to end, and one of its open ends is contracted, and preferably with a separate piece in the form of a contracted thimble or neck, *a*. This neck *a* is secured by solder, or in any other suitable manner, in the open end of the reservoir A, and so secured it projects therefrom, serving on its so projected portion both as a seat for an outside cap or cover, *a'*, and as a means of confining and holding a piece of sponge, *d*, or other material or materials capable of absorbing the liquid with which the reservoir may be charged in its use. The contracted neck *a* furnishes a ready means of holding the swab *d* tightly and securely, at the same time confining it sufficiently close together as to allow the cap or cover *a'* to be readily attached to and detached from the holder or cylinder. The open end of the cylinder opposite to that at which the swab *d* is located has an elastic bulb, *b*, attached, through which, by compressing it, to force the liquid in the reservoir into the swab. This bulb is conveniently and sufficiently attached by stretching it over the end of the cylinder, and it is to be removed, as from time to time it may be required to charge or fill the cylinder.

The use of this improved liquid-holder is simple and easy. The reservoir, first having removed the elastic bulb, is charged with the liquid desired, and then the bulb replaced, and with slight pressure then exerted thereon the liquid is forced into the swab and made to saturate and charge it, and through the swab the liquid with which it is charged is applied to the surface desired in a similar manner as when using a pencil or brush, the cylinder making the handle.

The device herein described makes a most serviceable and useful mucilage-holder and mucilage-pencil, as it were; but, as is obvious, it may be charged with water, and thus adapted as a moistener for adhesively-prepared surfaces, such as envelopes, postage-stamps, &c.

Having thus described my invention, I claim—

1. A liquid-holder and swab consisting of a receptacle or body, a sponge or other absorbent material, and an elastic bulb, substantially as described.

2. A liquid-holder and swab consisting of a receptacle or body having a contracted neck, a swab secured in and cap placed on said neck, and an elastic bulb, substantially as described.

In testimony whereof I have hereunto set my hand in the presence of two subscribing witnesses.

CHAS. S. PINKHAM.

Witnesses:
ALBERT W. BROWN,
KATE E. BELLOWS.